Nov. 4, 1969                J. D. REES, JR                3,476,478
APPARATUS FOR CHANGING THE MAGNIFICATION OF A PHOTOCOPIER
        WITHOUT CHANGING THE CONJUGATE LENGTH
                OF THE OPTICAL SYSTEM
Filed Jan. 3, 1967                             2 Sheets-Sheet 1

INVENTOR.
JAMES D. REES, JR.

BY

ATTORNEYS

INVENTOR.
JAMES D. REES, JR.
ATTORNEYS

3,476,478
APPARATUS FOR CHANGING THE MAGNIFICATION OF A PHOTOCOPIER WITHOUT CHANGING THE CONJUGATE LENGTH OF THE OPTICAL SYSTEM
James D. Rees, Jr., Pittsford, N.Y., assignor to Xerox Corporation, Rochester, N.Y., a corporation of New York
Filed Jan. 3, 1967, Ser. No. 607,049
Int. Cl. G03b 27/70
U.S. Cl. 355—55                    10 Claims

ABSTRACT OF THE DISCLOSURE

A photographic copying apparatus having an arrangement for changing the magnification of the optical system without affecting the total conjugate length of the system. A main lens is moved along the optical path and a thin, singlet, corrective lens is positioned into the optical path when the magnification is changed from the primary magnification to another magnification permitting an adjustment in the focal length of the lens system without changing any other parameters of the optical system.

---

This invention relates in general to optical systems for projecting images from an object plane to an image plane and in particular to an optical system for changing the magnification of the objects without changing the conjugate distance of the system or the optical path thereof.

More specifically, this apparatus is employed to make xerographic copies of a single size from different sized computer printer outputs. There are generally two sizes of output from computer printers and they are 8½″ x 11″ and 11 x 14¼″. It is considered desirable to standardize the copy of this output into one size for ease of filing and handling from that point on. In fact, it has been found desirable to maintain copies on a format of 8½ x 11″.

It would be inconvenient, to say the least, to require a separate copying machine for each computer printer output to achieve this standardization of copy paper. A more desirable system is to have a single copying machine capable of reducing the image size of the larger computer printer output, i.e., the 11 x 14¼″ to the more convenient 8½ x 11″ size. In order to achieve this, of course, the magnification of the larger image must be less than the 1:1 magnification used in maintaining an 8½ x 11″ image format from an 8½ x 11″ object input. The ratio would be 1:.7727. In order to reduce the image in a fixed conjugate optical system, which is desirable in an office copier apparatus, it is necessary to move the lens system toward the image in order to reduce the object size at the image plane. This must be done without degrading the image and, as with all commercial machines, in the least expensive manner possible.

Various methods and apparatus may be employed to achieve the desired results such as, for example, a lens turret system with multiple lenses placed in a turret in different planes generally perpendicular to the optical axis. A lens for the 1:1 magnification could be placed in the optical path for copying data input from an 8½ x 11″ object computer printer form then swung or revolved out of the way while a second lens placed in the turret could be moved into position along the optical axis closer to the image plane for reducing the 11 x 14¼″ object.

The two separate lenses would be of different focal lengths and would be mounted in the turret housing. However, there are several disadvantages to this system. First of all, two generally expensive lenses each comprised of multiple elements and each with a different focal length would be required. This obviously doubles the lens costs. Further, factory manufacturing adjustments of the turrets and housings for the lenses are insufficient to provide the best optical quality at both magnifications. Therefore, extremely tight lens manufacturing tolerances would be required for the individual lenses thus increasing the costs of such lenses. The system would require four adjustments to insure the best reproduction of the object at the image plane. The focus of each lens and the total conjugate for each magnification must be separately determined and then adjusted. If we have a fixed conjugate system, the adjustment of the conjugate could be adjusted for one of the magnifications only and adjustment of the two lenses for focus would have to be within that conjugate, thus resulting in extremely tight lens focal length tolerances.

Another method for achieving the desired results is by using only one lens in the system and adjusting the mirrors of the folded optics to extend or reduce the total conjugate distance within the copying machine. This system would permit the four factory adjustments required to fully adjust the total conjugate and focus for each of the two magnifications. Nevertheless there are disadvantages, e.g., four lens and mirror movements are required to change the magnification; they would be (1) longitudinal adjustment of the lens along the 1:1 magnification axis; (2) lens rotation about the 1:1 optical axis; (3) mirror motion perpendicular to the 1:1 magnification optical axis; and (4) mirror rotation about this axis thereby creating two optical paths and complex movements of the optical elements within the system. These four adjustments would require mechanical devices of high cost and complexity for the automatic change of magnification of the machine as required as well as the exacting positioning necessary for best optical results.

It is therefore an object of this invention to improve magnification change devices in an optical system.

A further object of this invention is to employ a single projection lens for copying objects onto image planes at either of two magnifications.

Another object of this invention is to eliminate the need for multiple lenses for achieving multiple magnifications within a fixed conjugate distance.

Yet another object of this invention is to change the magnification capabilities of a fixed conjugate optical system without changing the optical path of the system.

These and other objects of the invention are achieved by providing a projection lens capable of producing a 1:1 magnified image of an object from the object plane of a suitable copying device to the image plane of such a device and moving said projection lens axially relative to said image plane along the optical axis and adding thereto a second lens, hereinafter called an "add" lens, for slightly affecting the focal length of the total lens system while maintaining a fixed optical path and total conjugate distance for the copying apparatus.

For a better understanding of the invention as well as other objects and further features thereof, reference is had to the following detailed description of the invention to be read in conjunction with the accompanying drawings, wherein.

Figure 1:
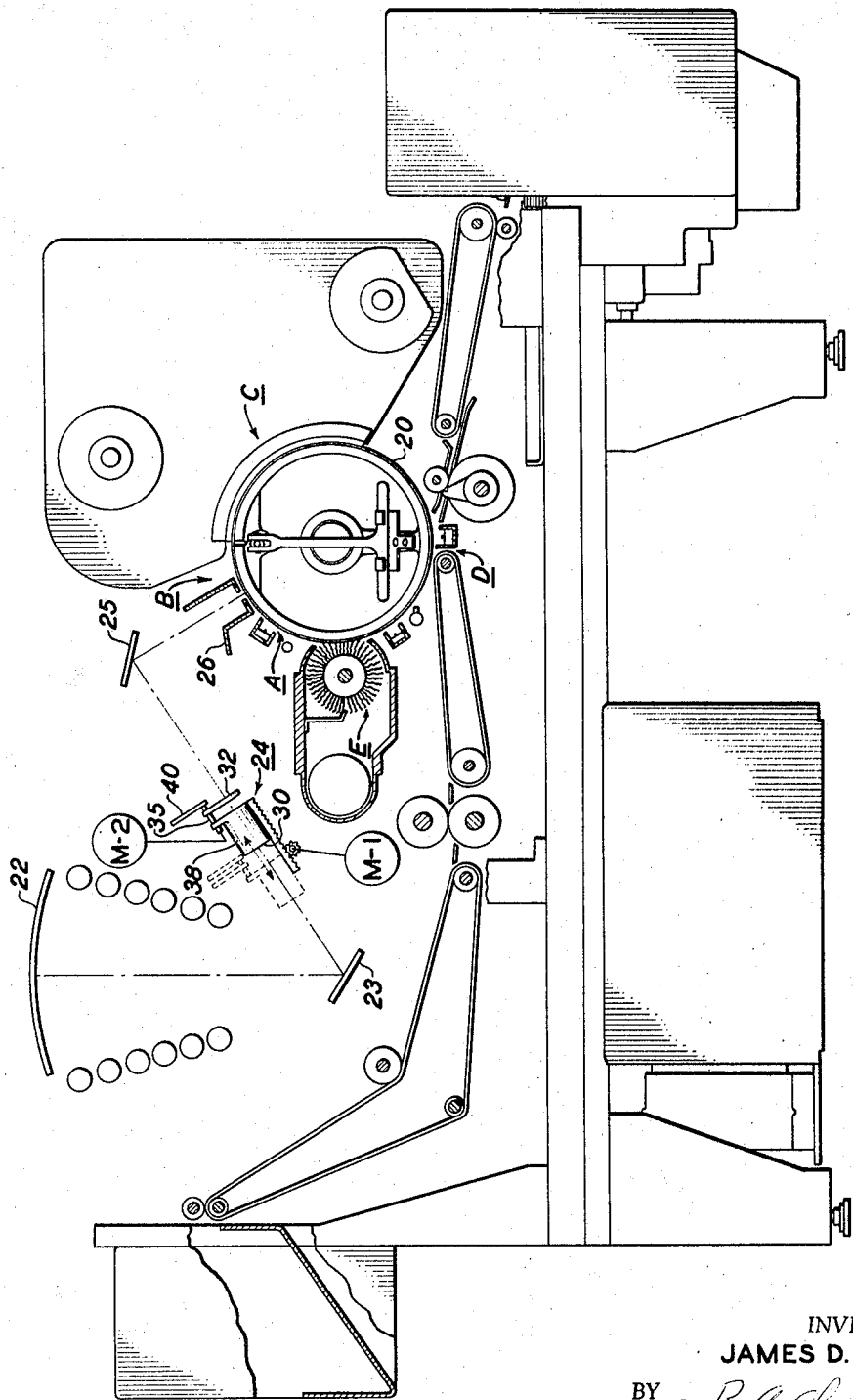
FIG. 1 illustrates schematically an embodiment of an automatic xerographic apparatus having an optical system.

As shown schematically in FIG. 1 the automatic xerographic reproducing apparatus comprises a xerographic plate 20 formed in the shape of a drum which is mounted on a shaft journaled in a suitable frame to rotate in the direction indicated by the arrow to cause the drum surface sequentially to pass a plurality of xerographic processing stations.

For the purpose of the present disclosure the several xerographic processing stations in the path of movement of the drum surface may be described functionally as follows:

A charging station preferably located as indicated by reference character A at which a uniform electrostatic charge is deposited on the photoconductive layer of the drum;

An exposure station, located preferably as shown by reference character B, at which a light or radiation pattern of copy to be reproduced and supplied by the object placed at the object plane is projected onto the drum surface to dissipate the drum charge in the exposed portions thereof thereby forming a latent electrostatic image of the copy to be reproduced;

A developing station C whereat the latent electrostatic image is developed by cascading an electrostatic powder over the drum forming a powder image corresponding to the latent electrostatic image on the drum;

An image transfer station D where the powder image is electrostatically transferred from the drum surface to a transfer material; and The cleaning station E where the drum is cleaned of residual powder and is discharged in order to prepare the drum surface for the next cycle.

The exposure station in the embodiment represented in FIG. 1 comprises an optical scanning assembly including a platen 22 serving to maintain a document at the object plane of the optical system and formed of a material such as glass plate or the like. The document to be placed on the platen 22 is uniformly illuminated and arranged in light projection relation to the moving light receiving surface of the xerographic drum. Uniform lighting is provided by banks of lamps arranged on opposite sides of the platen. Scanning of the document on the platen is accomplished by means of a mirror assembly which is oscillated relative to the copy board in timed relation to the movement of the xerographic drum. The mirror assembly, which includes an object mirror 23, is mounted below the platen to reflect an image of the document through a lens assembly 24 and onto an image mirror 25 which, in turn, reflects the image onto the xerographic drum through a slot in a fixed light shield 26 positioned adjacent to the xerographic drum surface.

The actual scanning of the object or document placed on the platen is accomplished by oscillating the object mirror 23 which reflects an image from the object through the lens assembly and onto the image mirror which, in turn, reflects the image through the slotted light shield 26 and onto the drum surface 20. For a more detailed description of the operation of the scanning mechanism see the Aser Patent No. 3,221,622 issued Dec. 7, 1965.

The scanning operation for reflecting light rays from an object at the platen 22 to the drum surface 20 at the slotted light shield 26 as well as the optical path remains constant in the operation of the xerographic copying apparatus no matter what the magnification setting of the lens assembly 24. In fact, one of the advantages of the invention is the employment of an unvarying optical path while producing copies at multiple magnifications thereby permitting a scanning mechanism such as that described above to operate without modification although different results, viz., magnification changes, are achieved.

In the 1:1 magnification the projection lens 30 is centered along the conjugate distance of the optical path and the "add" lenses such as lens 32 are positioned out of the optical path of the reflected light rays emanating from the object placed at platen 22 and reflected by the scanning object mirror 23. In a second magnification such as that shown in FIG. 1, where a reduction in the image size is required, the projection lens 30 is positioned nearer the image plane than the object plane and an "add" lens 32 is incorporated into the optical path.

Figure 2:
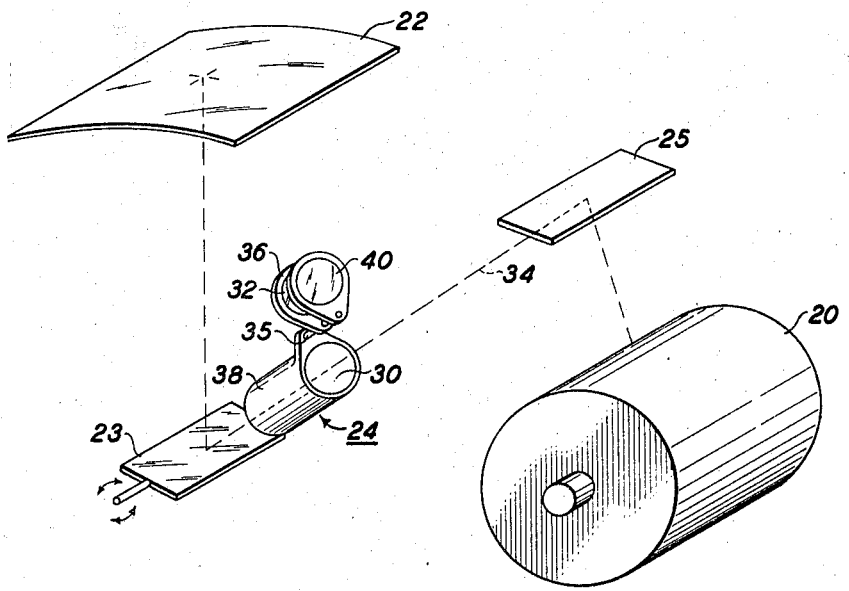
FIG. 2 is a schematic, isometrical view of the optical system of the apparatus of FIG. 1 in a first magnification position.

FIG. 2 shows a schematic in isometric form of the optical system of an embodiment of the apparatus in which the movable lens for change of magnification according to the invention is incorporated. FIG. 2 shows the system in a magnification designed to align and focus the projection lens within the optical system. In this case it is a 1:1 magnification and the lens is positioned midway along the optical path 34 of the optical system. When changing to a second magnification such as a reduction in image size as shown in FIG. 3, the lens is moved axially along the optical path 34 in order to change the magnification of the object at the platen 22 as it appears on the image plane 20 at the slit 26.

In order to maintain this system without realignment or change of conjugate length or optical path it is necessary to add to the main lens 30 an "add" lens 32 having a relatively long focal length. This is accomplished by any means to drop the "add" lens 32 into the optical path 34 of the system. As shown in the accompanying drawings, the "add" lens is pivotally mounted along a shaft 35 connecting the add lens housing 36 with the barrel 38 of the projection lens.

Figure 3:
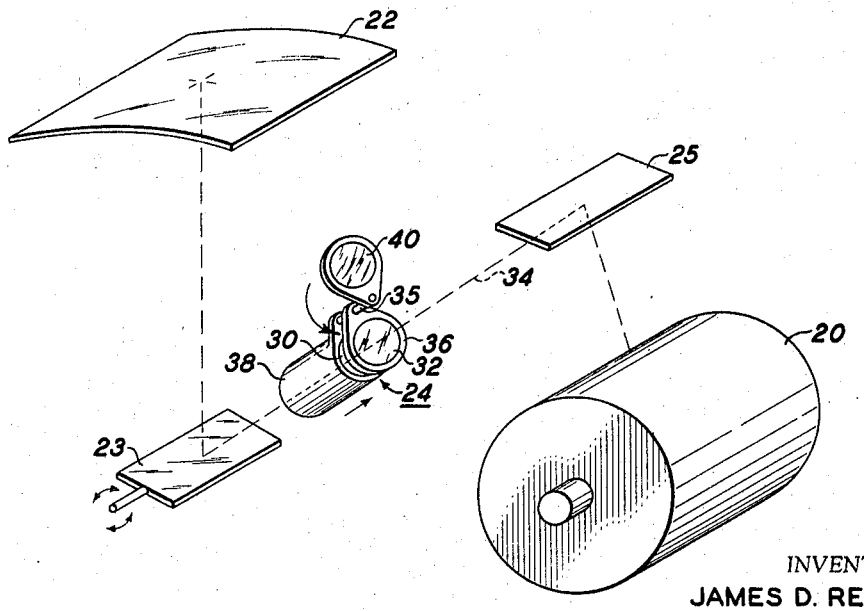
FIG. 3 is a schematic isometrical view of the same apparatus in a second magnification position.

When the operator of the machine such as that shown in FIG. 1 desires to change the magnification of the input, for example, from that of FIG. 2 to that of FIG. 3, he would activate some suitable mechanism causing a drive means such as the motor M-2 to rotate the add lens 32 or 40 into the optical path 34 as well as a drive means such as the motor M-1 to move the barrel 38 containing the projection lens 30 or the lens assembly 24 containing barrel 38 and "add" lens 32 along the optical path 34, to achieve the desired magnification change. The shaft length of shaft 35 between the projection lens and any "add" lens such as 32 or 40 must be preset for the system and magnification of the system when the "add" lens is interposed in the optical path thus providing an adjustment in the air space between the glass of lens 30 and the glass of "add" lens 32 or 40. Both the "add" lenses and the main lens move axially along the optical path to the desired second position. An "add" lens may be dropped or rotated into the optical path while the entire assembly 24 is moved along the optical path or it may drop in after the move is accomplished. A suitable camming mechanism attached to a motor could easily move the assembly 24 laterally along the optical axis while the "add" lens is rotated into or out of the optical path to achieve the desired results.

The operation of this simple system composed of the projection lens 30 and the long focal length "add" lens 32 is extremely easy to operate and to align within the machine embodiment such as that shown in FIG. 1. The entire optical system of the machine is aligned at a first, or in this case 1:1, magnification. The total conjugate distance is adjusted with the image mirror 25 being moved forward or backward to establish the necessary length of the optical path. The focus of the projection lens 30 is achieved by adjusting the barrel 38 containing the projection lens system 30 along the optical path 34 to properly focus the object plane at the image plane.

Next, the projection lens housed within barrel 38 is moved longitudinally along the optical axis to the second magnification position in this case a reduced magnification, toward the photoreceptive surface 20. At the same time or at some time before or after the projection lens has made its original shift, the "add" lens is placed into the optical path some finite distance relative to the projection lens, after the shift thereof. The focal length of the "add" lens is designed such that the combination of the "add" lens and the projection lens has a focal length allowing the total conjugate of the system to remain fixed while the magnification is changed as required. The combination lens is then shifted or adjusted along the optical path as a unit to adjust for the correct focus and magnification.

The correct magnification adjustment is performed in a somewhat unique way: the focal length of the combination is a function of the air spacing between the projection lens and the "add" lens. Thus the proper fine magnification adjustment can be performed at the alignment occurring at the factory, for example, by adjustment of this air space.

Several other advantages of this system are that the "add" lens is the only added optical component to the multiple magnification change system, and as shown in FIG. 1, the magnification can be multiplied more than once by using several "add" lenses each to be used either separately or in conjunction with one another. For individual magnification changes to increase the magnification at the image plane, the lens assembly 24 would be moved toward the object plane and a suitable "add" lens inserted in the optical path either on the object or image side of the projection lens 30. A second or third magnification could be a reduction necessitating the use of yet another "add" lens such as lens 40 which would be adjusted and interposed in the optical path in the same manner as the add lens 32.

The "add" lens 32 in the system described herein is a simple positive singlet lens requiring only standard manufacturing tolerances and will be of minor cost compared to the projection lens, which, of course, is desirable. Other advantages over prior art devices for multiple magnifications within a configuration such as is present here is that only two motions are required: the linear shift of the projection lens along the optical axis and the movement of the "add" lens in and out of the optical path. A further advantage is that since the "add" lens is so optically weak, i.e., has such an extremely long focal length, it is very insensitive to a slight misalignment.

An example of a system incorporating the invention herein and schematically shown in the drawings may have the following parameters:

Total conjugate: 48.00 inches
Speed of projection lens at 1:1: $f/4.5$ ($f/9.0$ effective)
Focal length of projection lens: 11.935 inches
Focal length of add lens: 552.3 inches
Required shift of projection lens from 1:1 to 1:.7727 magnification: 2.924 inches toward image plane
Projection lens to add lens air space (glass to glass): .50 inch
Speed of lens combination at 1:.7727: ($f/8.0$ effective)
Illumination increase incurred by magnification change from 1:1 to 1:.7727+20%. This increase in illumination is compensated for by incorporating within the "add" lens housing 36 an aperture stop to reduce the overall illumination making the illumination at the image plane equal for each of the magnifications of the system. An aperture stop of the type referred to in co-pending application Ser. No. 585,936 filed on Oct. 11, 1966 in the name of D. Harper is employed with the system herein to achieve the reduction of image plane illumination at the selected reduced magnification The following are formulas for determining approximation of the parameters to be incorporated within the system described herein. Note that the final parameters used in the system are disclosed hereinabove.

FOCAL LENGTH CALCULATIONS

Let:
D=total conjugate (nominal)
$f$=focal length of projection lens
$f''$=focal length of add lens
$f'$=focal length of combination
$m_1$= magnification at 1:1
$m_2$=magnification at 1:.7727

D=48.00 determined by mechanical considerations of the apparatus incorporating the optical system.

$m_1$=1.00
$m_2$=.7727 focal length=$mD/(m+1)^2$ (thin lens approximation)

$$f=m_1D/(m_1+1)^2$$
$$f=12.0 \text{ inches}$$
$$f'=m_2D/(m_2+1)^2 \text{ (where D is fixed at 48.00 inches)}$$
$$f'=11.8 \text{ inches}$$

$$f'=\frac{ff'}{f+f'} \text{ (thin lens approximation)}$$

$$f''=600 \text{ inches}$$

PROJECTION LENS POSITIONS

Object distances (document to projection lens center)

$$=\text{focal length}\left(1+\frac{1}{m}\right) \text{ (thin lens approximation)}$$

1:1 Object distance=$f\left(1+\frac{1}{m}\right)$

1:1 Object distance=24.0 inches

1:.7727 Object distance=$f'\left(1+\frac{1}{m}\right)$ $$=27.1 \text{ inches}$$

Projection lens shift—3.1 inches toward image plane
Effective $f$ numbers=infinity $f$ number×(1+$m$)
Effective $f$ number—$f$ number (infinity) (1+$m$)
Effective $f$ numbers at 1:1=$f/4.5(1+m_1)$
$=f/9.0$
Effective $f$ numbers at 1:.7727=$f/4.5(1+m_2)$
$=f/8.0$ While the invention has been described with reference to the structures disclosed herein, it is not confined to the details set forth; and this application is intended to cover such modifications or changes as may come within the purposes of the improvements or the scope of the following claims.

What is claimed is:

1. A projection system adapted for producing magnification changes, within a fixed conjugate distance of an object at the object plane of the projection system and along a fixed optical path between the object plane and the image plane thereof comprising a projection lens adapted to receive light rays emanating from the object, said projection lens being mounted for movement to any of multiple positions along the optical path of the projeciton system such that the magnification of the object is varied as said projections lens is moved along the optical path, said projection lens focusing the light rays at the image plane in at least one of the multiple positions, drive means associated with said projection lens to move said projection lens to the multiple positions thereof along the optical path, add lens means for positioning into and out of the optical path of said projection system when said projection lens is moved from one of the multiple positions to another to vary the magnification as aforesaid, said add lens means, when in the optical path, adapted to adjust the focal length of the combination of the projection lens and the add lens means such that the image at the image plane is in focus while the optical path and conjugate distance of said optical system remains constant.

2. A projection system adapted for producing magnification changes, within a fixed conjugate distance of an object at the object plane of the projection system and along a fixed optical path between the object plane and the image plane thereof comprising a projection lens adapted to receive light rays emanating from the object, said projection lens being mounted for movement to any of multiple positions along the optical path of the projection system such that the magnification of the object is varied as said projection lens is moved along the optical path, said projection lens focusing the light rays at the image plane in at least one of the multiple positions, drive means associated with said projection lens and adapted to move said projection lens to the multiple positions thereof along the optical path, at least one add lens positionable into and out of the optical path of said projection system when said projection lens is moved from one of the multiple positions to another to vary the magnification as aforesaid, said add lens, when in the optical path, adapted to adjust the focal length of the combination of the projection lens and the add lens such that the image at the image plane is in focus while the optical path and conjugate distance of said optical system remains constant, wherein the focal length $f''$ of said add lens is related to the focal length $f$ of the projection lens within the fixed total conjugate D of the projection system such that the focal length of $f'$ of the combination at a magnification $m_2$ is related to the local length $f$ of the projection lens at a magnification of $m_1$, according to the formula:

$$2f + \frac{f}{m_1} + fm_1 = 2f' + \frac{f'}{m_2} + f'm_2$$

the add lens being in the optical path when the projection system is magnifying at $m_2$ and placed out of the optical path when the projection system is magnifying at $m_1$.

3. A projection system adapted for producing manification changes, within a fixed conjugate distance of an object at the object plane of the projection system and along a fixed optical path between the object plane and the image plane thereof comprising a projection lens adapted to receive light rays emanating from the object, said projection lens being mounted for movement to any of multiple positions along the optical path of the projection system such that the magnification of the object is varied as said projection lens is moved along the optical path, said projection lens focusing the light rays at the image plane in at least one of the multiple positions, drive means associated with said projection lens and adapted to move said projection lens to the multiple positions thereof along the optical path, at least one add lens positionable into and out of the optical path of said projection system when said projection lens is moved from one of the multiple positions to another to vary the magnification as aforesaid, said add lens, when in the optical path, adapted to adjust the focal length of the combination of the projection lens and the add lens such that the image at the image plane is in focus while the optical path and conjugate distance of said optical system remains constant, having further associated therewith a first mirror arranged between the object plane and said projection lens, and a second mirror arranged between said projection lens and the image plane.

4. A projection system adapted for producing magnification changes, within a fixed conjugate distance of an object at the object plane of the projection system and along a fixed optical path between the object plane and the image plane thereof comprising a projection lens adapted to receive light rays emanating from the object, said projection lens being mounted for movement to any of multiple positions along the optical path of the projection system such that the magnification of the object is varied as said projection lens is moved along the optical path, said projection lens focusing the light rays at the image plane in at least one of the multiple positions, drive means associated with said projection lens and adapted to move said projection lens to the multiple positions thereof along the optical path, at least one add lens positionable into and out of the optical path of said projection system when said projection lens is moved from one of the multiple positions to another to vary the magnification as aforesaid, said add lens, when in the optical path, adapted to adjust the focal length of the combination of the projection lens and the add lens such that the image at the image plane is in focus while the optical path and conjugate distance of said optical system remains constant, wherein said projection lens has first and second positions along the optical path of the projection system, said positions located between the object plane and image plane thereof, said first position being nearer said object plane and said second position being nearer said image plane wherein a first magnification of the object when said projection lens is at said first position is greater than a second magnification of the object when said projection lens is at said second position, said add lens positionable within the optical path when said projection lens is at said second position, said add lens being removable from the optical system when said projection lens is at said first position.

5. The apparatus of claim 1 wherein said add lens means is positionable between said projection lens and said image plane when placed within the optical path, said add lens means being spaced a finite distance from said projection lens.

6. A projection system adapted for producing magnification changes, within a fixed conjugate distance of an object at the object plane of the projection system and along a fixed optical path between the object plane and the image plane thereof comprising a projection lens adapted to receive light rays emanating from the object, said projection lens being mounted for movement to any of multiple positions along the optical path of the projection system such that the magnification of the object is varied as said projection lens is moved along the optical path, said projection lens focusing the light rays at the image plane in at least one of the multiple positions, drive means associated with said projection lens and adapted to move said projection lens to the multiple positions thereof along the optical path, at least one add lens positionable into and out of the optical path of said projection system when said projection lens is moved from one of the multiple positions to another to vary the magnification as aforesaid, said add lens, when in the optical path, adapted to adjust the focal length of the combination of the projection lens and the add lens such that the image at the image plane is in focus while the optical path and conjugate distance of said optical system remains contant, said add lens is positionable between said projection lens and said image plane when placed within the optical path, said add lens spaced a finite distance from said projection lens, wherein said spacing between said projection lens and said add lens is an air space.

7. The apparatus of claim 1 wherein said add lens means is comprised of a singlet lens having a relatively long focal length.

8. A projection system adapted for producing magnification changes, within a fixed conjugate distance of an object at the object plane of the projection system and along a fixed optical path between the object plane and the image plane thereof comprising a projection lens adapted to receive light rays emanating from the object, said projection lens being mounted for movement to any of multiple positions along the optical path of the projection system such that the magnification of the object is varied as said projection lens is moved along the optical path, said projection lens focusing the light rays at the image plane in at least one of the multiple positions, drive means associated with said projection lens and adapted to move said projection lens to the multiple positions thereof along the optical path, at least one add lens positionable into and out of the optical path of said projection system when said projection lens is moved from one of the multiple positions to another to vary the magnification as aforesaid, said add lens, when in the optical path, adapted to adjust the focal length of the combination of the projection lens and the add lens such that the image at the image plane is in focus while the optical path and conjugate distance of said optical system remains constant, said add lens is comprised of a singlet lens having a relatively long focal length, wherein said singlet is a positive lens and said second magnification is less than said first magnification.

9. A projection system adapted for producing magnification changes, within a fixed conjugate distance of an object at the object plane of the projection system and along a fixed optical path between the object plane and the image plane thereof comprising a projection lens adapted to receive light rays emanating from the object, said projection lens being mounted for movement to any of multiple positions along the optical path of the projection system such that the magnification of the object is varied as said projection lens is moved along the optical path, said projection lens focusing the light rays at the image plane in at least one of the multiple positions, drive means associated with said projection lens and adapted to move said projection lens to the multiple positions thereof along the optical path, at least one add lens positionable into and out of the optical path of said projection system when said projection lens is moved from one of the multiple positions to another to vary the magnification as aforesaid, said add lens, when in the optical path, adapted to adjust the focal length of the combination of the projection lens and the add lens such that the image at the image plane is in focus while the optical path and conjugate distance of said optical system remains constant, an aperture stop optically associated with said add lens adapted to present approximately the same illumination at the image plane when the add lens is positioned in the optical path of the system as is presented to the image plane when the projection lens is positioned in, and the add lens is removed from, the optical path.

10. Apparatus according to claim 1 wherein said add lens means comprises at least two singlet lenses.

References Cited

UNITED STATES PATENTS 3,105,410   10/1963   Clapp _____ 88—24

NORTON ANSHER, Primary Examiner

R. A. WINTERCORN, Assistant Examiner

U.S. Cl. X.R.

355—3, 60

Dedication 3,476,478.—*James D. Rees, Jr.,* Pittsford, N.Y. APPARATUS FOR CHANGING THE MAGNIFICATION OF A PHOTOCOPIER WITHOUT CHANGING THE CONJUGATE LENGTH OF THE OPTICAL SYSTEM. Patent dated Nov. 4, 1969. Dedication filed Aug. 28, 1981, by the assignee, *Xerox Corp.*

Hereby dedicates to the Public claims 1, 2, and 4–8 of said patent.

[*Official Gazette December 15, 1981.*]